US011610580B2

(12) United States Patent
Freeman

(10) Patent No.: US 11,610,580 B2
(45) Date of Patent: Mar. 21, 2023

(54) SYSTEM AND METHOD FOR DETERMINING REASONS FOR ANOMALIES USING CROSS ENTROPY RANKING OF TEXTUAL ITEMS

(71) Applicant: Verint Americas Inc., Alpharetta, GA (US)

(72) Inventor: Cynthia Freeman, Spokane, WA (US)

(73) Assignee: Verint Americas Inc., Alpharetta, GA (US)

(*) Notice: Subject to any disclaimer, the term of this patent is extended or adjusted under 35 U.S.C. 154(b) by 46 days.

(21) Appl. No.: 16/810,310

(22) Filed: Mar. 5, 2020

(65) Prior Publication Data

US 2020/0286469 A1 Sep. 10, 2020

Related U.S. Application Data

(60) Provisional application No. 62/814,901, filed on Mar. 7, 2019.

(51) Int. Cl.
*G06F 40/20* (2020.01)
*G10L 15/183* (2013.01)
*G06N 20/00* (2019.01)
*G10L 15/06* (2013.01)

(52) U.S. Cl.
CPC ............ *G10L 15/183* (2013.01); *G06F 40/20* (2020.01); *G06N 20/00* (2019.01); *G10L 15/063* (2013.01)

(58) Field of Classification Search
CPC ......... G10L 15/183; G06F 40/02; G06F 40/03
See application file for complete search history.

(56) References Cited

U.S. PATENT DOCUMENTS

| 6,772,120 B1 | 8/2004 | Moreno et al. |
| 9,256,663 B2* | 2/2016 | Bhatia .................. G06F 16/285 |
| 9,407,651 B2 | 8/2016 | Mathis |
| 9,411,800 B2 | 8/2016 | Morin et al. |

(Continued)

FOREIGN PATENT DOCUMENTS

| EP | 3623964 | 3/2020 |
| KR | 1020180081444 | 7/2018 |

(Continued)

OTHER PUBLICATIONS

Adams, R., et al., "Bayesian Online Changepoint Detection," arXiv preprint arXiv:0710.3742, 2007, 7 pages.

(Continued)

*Primary Examiner* — Douglas Godbold
(74) *Attorney, Agent, or Firm* — Meunier Carlin & Curfman LLC

(57) ABSTRACT

A framework for reducing the number of textual items reviewed to determine the source of or reason for an anomaly in a time series that is used to track metrics in textual data is provided. According the framework, textual items in a time window corresponding to the anomaly are ranked according to the cross-entropy as determined by applying a language model to the relevant textual items and ranking textual items that most likely triggered an anomaly in time series data based on the cross-entropy value. In an aspect, a predetermined number of textual items having the highest cross-entropy are provided or all textual items having cross-entropy value higher than predetermine threshold are provided.

27 Claims, 1 Drawing Sheet

(56) References Cited

U.S. PATENT DOCUMENTS

| | | | |
|---|---|---|---|
| 9,729,727 | B1 | 8/2017 | Zhang |
| 10,607,604 | B2 | 3/2020 | Itoh et al. |
| 10,805,327 | B1* | 10/2020 | Grilli ............... G06F 40/279 |
| 10,896,472 | B1 | 1/2021 | Stack et al. |
| 11,222,627 | B1 | 1/2022 | Qian et al. |
| 2005/0060222 | A1 | 3/2005 | White |
| 2007/0299798 | A1 | 12/2007 | Suyama et al. |
| 2008/0052259 | A1 | 2/2008 | Shiffman et al. |
| 2009/0192781 | A1 | 7/2009 | Bangalore et al. |
| 2012/0109651 | A1 | 5/2012 | Chen |
| 2012/0127540 | A1 | 5/2012 | Moore et al. |
| 2012/0136703 | A1 | 5/2012 | Stewart |
| 2012/0136704 | A1 | 5/2012 | Carlson et al. |
| 2012/0143860 | A1 | 6/2012 | Gherman et al. |
| 2012/0254333 | A1 | 10/2012 | Chandramouli et al. |
| 2013/0018650 | A1 | 1/2013 | Moore et al. |
| 2013/0046531 | A1 | 2/2013 | Chandramouli et al. |
| 2013/0138428 | A1 | 5/2013 | Chandramouli et al. |
| 2013/0246386 | A1* | 9/2013 | Gherman ............ G06F 40/216 |
| | | | 707/706 |
| 2013/0282626 | A1 | 10/2013 | White |
| 2014/0222476 | A1* | 8/2014 | Romano ............ G06Q 10/063 |
| | | | 705/7.11 |
| 2014/0280621 | A1 | 9/2014 | Bourdaillet et al. |
| 2014/0344013 | A1 | 11/2014 | Karty |
| 2015/0047026 | A1 | 2/2015 | Neil et al. |
| 2016/0055457 | A1 | 2/2016 | Mather |
| 2016/0117466 | A1 | 4/2016 | Singh |
| 2016/0170996 | A1 | 6/2016 | Frank et al. |
| 2017/0068709 | A1* | 3/2017 | Dasgupta ................ G06F 11/30 |
| 2017/0294192 | A1 | 10/2017 | Bradley et al. |
| 2017/0357828 | A1* | 12/2017 | Phillips ................... G06F 16/00 |
| 2018/0018686 | A1 | 1/2018 | Wood et al. |
| 2018/0032862 | A1* | 2/2018 | Oliner .................. G06N 3/0445 |
| 2018/0048661 | A1 | 2/2018 | Bird et al. |
| 2018/0091539 | A1* | 3/2018 | Marquardt ............ G06F 7/5443 |
| 2018/0113782 | A1 | 4/2018 | Valacich et al. |
| 2018/0174600 | A1 | 6/2018 | Chaudhuri et al. |
| 2018/0217749 | A1 | 8/2018 | Alsharif et al. |
| 2018/0316704 | A1 | 11/2018 | Durairaj et al. |
| 2018/0373991 | A1 | 12/2018 | Rosenberg et al. |
| 2019/0037046 | A1 | 1/2019 | Orback |
| 2019/0138643 | A1 | 5/2019 | Saini et al. |
| 2019/0188741 | A1 | 6/2019 | Wood et al. |
| 2019/0205771 | A1* | 7/2019 | Lin ........................ G06F 40/30 |
| 2019/0236139 | A1 | 8/2019 | DeFelice et al. |
| 2019/0236148 | A1 | 8/2019 | DeFelice |
| 2019/0304470 | A1 | 10/2019 | Ghaemmaghami et al. |
| 2019/0354524 | A1* | 11/2019 | Xu ........................ G06F 11/079 |
| 2019/0392252 | A1 | 12/2019 | Fighel et al. |
| 2020/0160180 | A1 | 5/2020 | Lehr |
| 2020/0160229 | A1 | 5/2020 | Atcheson |
| 2020/0401768 | A1 | 12/2020 | Freeman |
| 2021/0081501 | A1* | 3/2021 | RoyChowdhury ... G06F 40/205 |
| 2022/0180061 | A1 | 6/2022 | Kim et al. |
| 2022/0189599 | A1 | 6/2022 | Petch et al. |

FOREIGN PATENT DOCUMENTS

| | | |
|---|---|---|
| WO | 2007/005975 | 1/2007 |
| WO | 2018/128403 | 7/2018 |
| WO | 2019/060327 | 3/2019 |

OTHER PUBLICATIONS

Ahmad, S., et al., "Unsupervised real-time anomaly detection for streaming data," Neurocomputing, vol. 262, 2017, pp. 134-147.

Aktolga, E., et al., "Detecting Outlier Sections in US Congressional Legislation," Proceedings of the 34th International ACM SIGIR Conference on Research and Development in Information Retrieval, 2011, pp. 235-244.

Allen, L., et al., "On Twitter Purge: A Retrospective Analysis of Suspended Users," Association for the Advancement of Artificial Intelligence, 2020, 8 pages.

Brownlee, J., "How to Check if Time Series Data is Stationary with Python," retrieved on Dec. 13, 2019 at https://machinelearningmastery.com/time-series-data-stationary-python, 2016, 51 pages.

Buck, C., et al., "N-gram Counts and Language Models from the Common Crawl," Proceedings of the Ninth International Conference on Language Resources and Evaluation (LREC), 2014, pp. 3579-3584.

Chandola, V., et al., "Anomaly Detection: A Survey," ACM Computing Surveys, vol. 41, No. 3, Article 15, 2009, 58 pages.

Cheung, Y.-W., et al., "Lag Order and Critical Values of the Augmented Dickey-Fuller Test," Journal of Business & Economic Statistics, vol. 13, No. 3, 1995, pp. 277-280.

Choudhary, S., et al., "Sparse Decomposition for Time Series Forecasting and Anomaly Detection," Proceedings of the SIAM International Conference on Data Mining, 2018, pp. 522-530.

Cleveland, R.B., et al., "STL: A Seasonal-Trend Decomposition Procedure Based on Loess," Journal of Official Statistics, vol. 6, No. 1, 1990, pp. 3-73.

Danescu-Niculescu-Mizil, C., et al., "No Country for Old Members: User Lifecycle and Linguistic Change in Online Communities," Proceedings of the 22nd International Conference on World Wide Web, 2013, pp. 307-318.

"datastream.io," Mentat Innovations, retrieved on Jan. 6, 2020 from https://blog.ment.at/datastream-io-4863db7286b7, 2017, 2 pages.

Forsyth, E., et al., "The NPS Chat Corpus," retrieved on Apr. 21, 2020 at http://faculty.nps.edu/cmartell/NPSChat.htm, 2019, 2 pages.

Freeman, C., et al., ; "Experimental Comparison of Online Anomaly Detection Algorithms," The 32nd International Florida Artificial Intelligence Research Society Conference (Flairs-32), 2019, pp. 364-369.

Fulton, C., "Estimating time series models by state space methods in Python: Statsmodels," http://www.chadfulton.com/fulton_statsmodels, 2017, 78 pages.

Grave, E., et al., "Unbounded cache model for online language modeling with open vocabulary," Advances in Neural Information Processing Systems, 2017, pp. 6042-6052.

Guthrie, D., et al., "An Unsupervised Approach for the Detection of Outliers in Corpora," Statistics, 2008, pp. 3409-3413.

Guthrie, D., "Unsupervised Detection of Anomalous Text," Thesis, 2008, 186 pages.

Herath, J.D., et al., "RAMP: Real-Time Anomaly Detection in Scientific Workflows," IEEE International Conference on Big Data (Big Data), 2019, pp. 1367-1374.

Hochenbaum, J., et al., "Automatic Anomaly Detection in the Cloud via Statistical Learning," arXiv preprint arXiv:1704.07706, 2017, 13 pages.

Hyndman, R.J., et al., "Automatic Time Series Forecasting: The forecast Package for R," Journal of Statistical Software, vol. 27, Issue 3, 2008, 22 pages.

Inouye, D., et al., "A Review of Multivariate Distributions for Count Data Derived from the Poisson Distribution," Computational Statistics, vol. 9, No. 3, 2017, 40 pages.

Isbister, T., "Anomaly detection on social media using ARIMA models," Thesis, Uppsala Universitet, 2015, 38 pages.

Jain, S., et al., "Characterizing and Detecting Livestreaming Chatbots," IEEE/ACM International Conference on Advances in Social Networks Analysis and Mining, 2019, pp. 683-690.

Jozefowicz, R., et al., "Exploring the Limits of Language Modeling," arXiv preprint arXiv:1602.02410, 2016, 11 pages.

Kannan, R., et al., "Outlier Detection for Text Data," 15th Proceedings of the 2017 SIAM International Conference on Data Mining, 2017, pp. 489-497.

Kenter, T., et al., "Short Text Similarity with Word Embeddings," Proceedings of the 24th ACM International Conference on Information and Knowledge Management, 2015, pp. 1411-1420.

Keshvani, A., "How to use the Autocorreation Function (ACF)?," https://coolstatsblog.com/2013/08/07/how-to-use-the-autocorreation-function-acf, 2013, 2 pages.

(56) References Cited

OTHER PUBLICATIONS

Kowalska, K., et al., "Maritime Anomaly Detection using Gaussian Process Active Learning," IEEE 15th International Conference on Information Fusion, 2012, pp. 1164-1171.

Kulick, J., "Bayesian change-point detection," https://github.com/hildensia/bayesian_changepoint_detection, 2016, 1 page.

Laptev, N., et al., "Generic and Scalable Framework for Automated Time-series Anomaly Detection," Proceedings of the 21th ACM SIGKDD International Conference on Knowledge Discovery and Data Mining, 2015, pp. 1939-1947.

Lata, L., et al., "A Comprehensive Survey of Fraud Detection Techniques," International Journal of Applied Information Systems, vol. 10, No. 2, 2015, pp. 26-32.

Lavin, A., et al., "Evaluating Real-time Anomaly Detection Algorithms—the Numenta Anomaly Benchmark," IEEE 14th International Conference on Machine Learning and Applications (ICMLA), 2015, pp. 38-44.

Lili, C., "Research of E-commerce Supply Chain Management with CreditRisk + model," International Conference on Management of e-Commerce and e-Government, 2012, 3 pages.

Linden, M., "Testing Growth Convergence with Time Series Data—a non-parametric approach," International Review of Applied Economics, vol. 14, Issue 3, 2000, pp. 361-370.

Liu, S., et al., "Online Conditional Outlier Detection in Nonstationary Time Series," Proceedings of the International Florida AI Research Society Conference. Florida AI Research Symposium, HHS Public Access, 2017, 15 pages.

Liu, D., et al., "Apprentice: Towards Practical and Automatic Anomaly Detection Through Machine Learning," Proceedings of the 2015 Internet Measurement Conference (ACM), 2015, pp. 211-224.

Lowe, R., et al., "The Ubuntu Dialogue Corpus: A Large Data Set for Research in Unstructured Multi-Turn Dialogue Systems," Proceedings of the SIGDIAL 2015 Conference, 2015, pp. 285-294.

Madrid, F., et al., "Efficient and Effective Labeling of Massive Entomological Datasets," IEEE International Conference on Data Science and Advanced Analytics (DSAA), 2019, 9 pages.

"Media Bias Fact Check," NowThis News, retrieved on Apr. 21, 2020 at https://mediabiasfactcheck.com/nowthis-news/, 2019, 5 pages.

Mueen, A., et al., "The Fastest Similarity Search Algorithm for Time Series Subsequences under Euclidean Distance and Correlation Coefficient," retrieved on May 27, 2020 at http://www.cs.unm.edu/~mueen/FastestSimilaritySearch.html, 2017, 3 pages.

Norvig, P., "How to Write a Spelling Corrector," retrieved on May 27, 2020 at https://norvig.com/spell-correct.html, 2007, 10 pages.

Phua, C., et al., "A Comprehensive Survey of Data Mining-based Fraud Detection Research," arXiv preprint arXiv:1009.6119, 2010, 14 pages.

Prusher, I, "Parkland Mourns. Tragedy Strikes a Florida Community," Time, 2018, 7 pages.

Robertson, S., et al., "The Probabilistic Relevance Framework: BM25 and Beyond," Foundations and Trends in Information Retrieval, vol. 3, No. 4, 2009, pp. 333-389.

Rodriguez, J., "Poisson Models for Count Data," Acesso, vol. 10, No. 2, 2007, 14 pages.

Salvatier, J., et al., "Probabilistic Programming in Python using PyMC3," PeerJ Computer Science, 2016, 20 pages.

Saurav, S., et al., "Online Anomaly Detection with Concept Drift Adaptation using Recurrent Neural Networks," Proceedings of the ACM India Joint International Conference on Data Science Management of Data, 2018, pp. 78-87.

Savage, D., et al., "Anomaly Detection in Online Social Networks," Social Networks, vol. 39, No. 1, 2014, pp. 62-70.

Schreiber, J, "Pomegranate: fast and flexible probabilistic modeling in python," The Journal of Machine Learning Research, vol. 18, No. 1, 2017, pp. 5992-5997.

Seabold, S., et al., "Statsmodels: Econometric and Statistical Modeling with Python," Proceedings of the 9th Python in Science Conference (SCIPY), 2010, 57 pages.

Shaoul, C., et al., "A reduced redundancy USENET corpus (2005-2011)," Westbury Lab Web Site, retrieved on Apr. 21, 2020 at http://www.psych.ualberta.ca/~westburylab/downloads/usenetcorpus.download.html, 2013, 2 pages.

Singh, N., et al., "Demystifying Numenta Anomaly Benchmark," IEEE International Joint Conference on Neural Networks (IJCNN), 2017, pp. 1570-1577.

Sordoni, A., et al., "A Neural Network Approach to Context-Sensitive Generation of Conversational Responses," arXiv:1506.06714v1, 2015, 11 pages.

Steyn, H. "On the multivariate poisson normal distribution," Journal of the American Statistical Association, vol. 71, No. 353, 1976, pp. 233-236.

Tatbul, N., et al., "Precision and Recall for Time Series," 32nd Conference on Neural Information Processing Systems (NeurIPS), 2018, 11 pages.

Taylor, S., et al., "Forecasting at Scale," PeerJ Preprints, 2017, pp. 37-45.

"The Numenta Anomaly Benchmark," retrieved on Apr. 24, 2020 at https://github.com/numenta/NAB, 2018, 5 pages.

Vallis, O., et al., "A Novel Technique for Long-Term Anomaly Detection in the Cloud," HotCloud, 2014, 6 pages.

Wang, Z., et al. "Automatic Model Selection for Anomaly Detection," IEEE Computer Society, TrustCom-BigDataSE-ISPA, 2016, pp. 276-283.

Xia, Y., et al., "NIL is Not Nothing: Recognition of Chinese Network Informal Language Expressions," Proceedings of the 4th SIGHAN Workshop on Chinese Language Processing, 2005, 8 pages.

Yamanishi, K., et al., "On-line Unsupervised Outlier Detection Using Finite Mixtures with Discounting Learning Algorithms," Data Mining and Knowledge Discovery, vol. 8, No. 3, 2004, pp. 275-300.

Zhu, L., et al., "Deep and Confident Prediction for Time Series at Uber," IEEE International Conference on Data Mining Workshops (ICDMW), 2017, 8 pages.

Zhuang, H., et al., "Identifying Semantically Deviating Outlier Documents," Proceedings of the 2017 Conference on Empirical Methods in Natural Language Processing, 2017, pp. 2748-2757.

Kelly, S., et al., "Propagating Disaster Warnings on Social and Digital Media," International Conference on Pervasive Computing, 2015, pp. 475-484.

Search Report, dated Jul. 23, 2020, received in connection with corresponding EP Patent Application No. 20161318.9.

Chen, Y-C, et al., "Event Detection using Customer Care Calls," Proceedings of the IEEE International Conference on Computer Communications (INFOCOM), 2013, pp. 1690-1698.

Mäkinen, M. S., "Deep Learning for Anomaly Detection in Linux System Log," Thesis, Aalto University School of Science, 2019, 61 pages.

"Anomaly Detection: Numenta Anomaly Benchmark," Machine Intelligence Technology, 2017, 7 pages.

Banerjee, A., et al., "Anomaly Detection: A Tutorial," SIAM Conference on Data Mining, 2008, 103 pages.

Freeman, C., et al., "Human-in-the-Loop Selection of Optimal Time Series Anomaly Detection Methods," 7th AAAI Conference on Human Computation and Crowdsourcing (HCOMP), 2019, 3 pages.

Hawkins, J., et al., "Hierarchical Temporal Memory including HTM Cortical Learning Algorithms," Numenta, 2011, 68 pages.

Hodge, V., et al., "A Survey of Outlier Detection Methodologies," Artificial Intelligence Review, vol. 22, No. 2, 2004, pp. 85-126.

Hyndman, R. J., "Anomalous time-series R Package," retrieved on Nov. 5, 2020 from https://github.com/robjhyndman/anomalous, 2018, 3 pages.

Jiang, N., "Perplexity Vs Cross-entropy," retrieved on Oct. 2, 2020 from https://jiangnanhugo.github.io/2016/perplexity-vs-cross-entropy, 2016, 3 pages.

Keogh, E., et al., "Hot Sax: Efficiently Finding the Most Unusual Time Series Subsequence," The 5th IEEE International Conference on Data Mining (ICDM), 2005, pp. 440-449.

"Luminol," LinkedIn, retrieved on Novembers, 2020 from https://github.com/linkedin/luminol, 2018, 9 pages.

(56) References Cited

OTHER PUBLICATIONS

Morgan, A., et al., "Anomalyzer: Probabilistic anomaly detection for time series data," Lytics, retrieved on Nov. 4, 2020 from https://github.com/lytics/anomalyzer, 2015, 4 pages.

"Skyline," Etsy, retrieved on Nov. 5, 2020 from https://github.com/etsy/skyline, 2015, 5 pages.

"Surus," Netflix, retrieved on Nov. 5, 2020 from https://github.com/Netflix/Surus, 2015, 3 pages.

\* cited by examiner

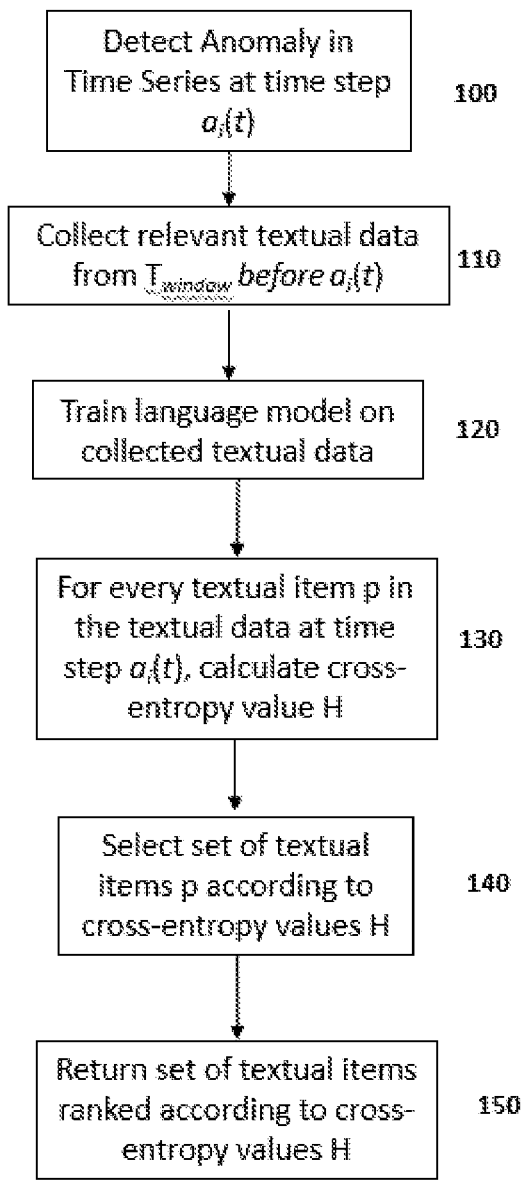

SYSTEM AND METHOD FOR DETERMINING REASONS FOR ANOMALIES USING CROSS ENTROPY RANKING OF TEXTUAL ITEMS

This application claims priority to U.S. Provisional Patent Application Ser. No. 62/814,901, filed Mar. 7, 2019, which is hereby incorporated by this reference in its entirety as if fully set forth herein.

BACKGROUND

Field

Embodiments of the present invention relate to a framework for understanding why an anomaly occurred in time series data, specifically a system and method using cross-entropy of a selected language model with conversation data to identify textual items indicative of the reason for the anomaly.

Background

Suppose an anomaly is detected in a time series tracking some metric in conversational data. Given this anomaly's occurrence, identifying the conversations that likely triggered the anomaly can be meaningful to determining why an anomaly has occurred, which can be helpful for ensuring undisrupted business and efficient troubleshooting. This why can be revealed by analyzing the textual data. One solution is to collect all conversations that occurred at the same time point as the anomaly. For example, suppose the time series has a time step size of 1 hour. On hour x, an anomaly is deemed to have occurred by some user-chosen anomaly detection method. All conversations that occurred at time x can be reviewed to determine what triggered the anomaly. However, there could be many conversations in that hour and review of all conversations or even a significant portion of those conversations can be time consuming and cumbersome. A system and method are needed to reduce the processing time and to save review time to allow for a solution to the anomaly to be introduced faster.

BRIEF SUMMARY OF THE DISCLOSURE

Accordingly, the present invention is directed to a system and method for determining reasons for anomalies using cross entropy ranking of textual items that obviates one or more of the problems due to limitations and disadvantages of the related art.

In accordance with the purpose(s) of this invention, as embodied and broadly described herein, this invention, in one aspect, relates to a method using one or more processing devices that includes detecting an anomaly in a time series that is used to track metrices in textual data; identifying a time step $a_t(t)$ associated with the detected anomaly; collecting relevant textual data from a time window $t_{window}$ associated with the detected anomaly; training a language model on the relevant textual data; for every textual item at time step $a_t(t)$, calculating a cross-entropy value according to the language model; and generating a set of textual items having a cross-entropy value greater that a predetermined value.

In another aspect, the invention relates to a system comprising a processing device and a memory device in which instructions executable by the processing device are stored for causing the processor to detect an anomaly in a time series that is used to track metrices in textual data; identify a time step $a_t(t)$ associated with the detected anomaly; collect relevant textual data from a time window $t_{window}$ associated with the detected anomaly; train a language model on the relevant textual data; for every textual item at time step $a_t(t)$, calculate a cross-entropy value according to the language model; and generate a set of textual items having a cross-entropy value greater that a predetermined value.

In yet another aspect, the invention relates to a non-transitory computer-readable storage medium having program code that is executable by a processor to cause a computing device to perform operations, the operations comprising: detecting an anomaly in a time series that is used to track metrices in textual data; identifying a time step $a_t(t)$ associated with the detected anomaly; collecting relevant textual data from a time window $t_{window}$ associated with the detected anomaly; training a language model on the relevant textual data; for every textual item at time step $a_t(t)$, calculating a cross-entropy value according to the language model; and generating a set of textual items having a cross-entropy value greater that a predetermined value.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

It is to be understood that both the foregoing general description and the following detailed description are exemplary and explanatory only, and are not restrictive of the invention as claimed.

BRIEF DESCRIPTION OF THE DRAWINGS

The accompanying FIGURES, which are incorporated herein and form part of the specification, illustrate a system and method for determining reasons for anomalies using cross entropy ranking of textual items. Together with the description, the FIGURES further serve to explain the principles of the system and method for determining reasons for anomalies using cross entropy ranking of textual items described herein and thereby enable a person skilled in the pertinent art to make and use the system and method for determining reasons for anomalies using cross entropy ranking of textual items.

FIG. 1 is flow chart illustrating steps of an exemplary framework according to principles described herein.

DETAILED DESCRIPTION

Reference will now be made in detail to embodiments of the system and method for determining reasons for anomalies using cross entropy ranking of textual items with reference to the accompanying FIGURES.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Provided herein is a framework for ranking textual items that most likely triggered an anomaly or unusual behavior in time series data. Suppose an anomaly is detected in a time series tracking some metric in conversational data. Given this anomaly's occurrence, we wish to identify and to collect the conversations that likely triggered the anomaly. That is, we look to the textual items around the anomaly and around the time of the anomaly. Determining why an anomaly has occurred helps ensure undisrupted business and efficient troubleshooting. This why can be revealed by analyzing the textual data.

As discussed above, one solution is to collect all conversations that occurred at the same time point x as the anomaly. Then all conversations that occurred at x can be reviewed to determine the source or reason for the anomaly. However, there could be many conversations in that hour x causing unnecessary computational complexity.

To reduce the computational complexity of the problem of identifying why an anomaly has occurred, thereby saving computational resources, such as CPU times and memory spaces by more quickly identifying the source of or reason for the anomaly, and to make review of the textual items to identify the reason for or source of the anomaly more efficient, the most likely conversations that triggered the anomaly can be ranked according to their cross-entropies. These ranked conversations are provided in rank order and the top k conversations in the time period x are analyzed to determine which might have triggered the anomaly, where k conversations is fewer than all conversations in that time period x.

The ranking function may be performed using snapshot language models (SLM) [Danescu-Niculescu-Mizil et al., 2013] and determining the cross-entropy of these models with conversational data. The cross-entropy can be considered a measure of how "surprising" a conversation is relative to a linguistic state as determined by the snapshot language model. This framework is not limited to any particular anomaly detection method or language model; however, the exemplary snapshot language model (SLM) is described herein for the purposes of explaining the novel framework provided herein. In addition, the framework can be applied to any kind of time series that is used to track metrics in textual data.

A method for implementing the framework takes as input the following:
- a time series that is used to track metrics in textual data
- an anomaly detection method
- a language modeling technique
- n (how textual items will be divided, e.g. if n=2, bigrams will be created from the textual items)
- $t_{window}$ (window range to train the language model)
- k (how many textual items will be returned)

The output is the top k textual items that most likely triggered the anomaly. A ranked output of k textual items is provided by using the following process:
1. Apply the anomaly detection method on the time series data to determine a list of anomalies. Let $a_i$ represent the ith detected anomaly in the time series.
2. For every anomaly $a_i$:
   Let $a_i(t)$ be the time step of that detected anomaly's occurrence. Collect all relevant textual data from $a_i(t) \, t_{window}$ to $a_i(t)$ (non-inclusive) and train a language model (SLM) on this data.
   Collect all textual data at $a_i(t)$, and for every textual item p, calculate how "surprising" it is relative to the SLM using cross-entropy:

$$H(p, SLM) = -\frac{1}{N}\sum_j \log(P_{SLM}(p_j))$$

$p_j$=n-grams making up p
N=number of n-grams
$P_{SLM}(p_j)$=probability of n-gram $p_j$ under the SLM
Rank all p by H(p, SLM)
Return the top k many p as determined by H(p, SLM)

The SLM serves as a way to represent the linguistic state of the data before the anomaly occurs. A language model is a probability distribution. It takes a sequence such as a sentence, and it determines the probability of that sentence's presence given some book or article or other body of text. Given a textual item p made at time $a_i(t)$, we calculate its cross-entropy with respect to the snapshot model generated for $a_i(t) \, t_{window}$ to $a_i(t)$ (non-inclusive). The higher H(p, SLM) is, the more surprising the item p is given the recent, past linguistic state. The lower H(p, SLM) is, the less surprising. In other words, a low H(p, SLM) means that p reflects what is commonly seen in the past (before the anomaly). Also, note that since the cross entropy will naturally get larger the bigger p is (in terms of number of words), we can also optionally just use the first 20-30 words of p, or other appropriate number of words in the text. How much text to trim or include in p is left to the user.

This system can be used in place of time-consuming analysis of all textual items p that occur at $a_i(t)$. Instead, reviewers can now focus on the top k many textual items as determined by how "surprising" they are as compared to a recent, previous linguistic state. Also, rather than a predetermined number of textual items, the textual items returned can be the textual items having a cross-entropy value above a threshold value, regardless of the number of textual times returned.

The choice of $t_{window}$ and when anomalies occur may cause language models to be trained on anomalous data. More specifically, if two anomalies occur close to one another, the 2nd anomaly's $t_{window}$ may intersect with the 1st anomaly. For this reason, it is suggested that a filtering technique be used after anomaly detection occurrence so that anomalies do not occur more than once every $t_{window}$ time steps. Anomalies should be, by definition, rare. A linguistic state to compare an anomaly to should not contain anomalies itself.

Additional or alternative aspects can implement or apply rules of a particular type that improve existing technological processes involving textual data, including intelligent virtual assistants (IVAs), textual or voice to text inputs, and other metrics associated with textual data. The system and method can be performed via a computing system, centralized or distributed, that may be used for processing textual data.

FIG. 1 illustrates the steps of the present framework applied to a time series, which may be used to track metrics in textual data. Any language model technique may be applied. At step 100, an anomaly is detected in a time series at time step $a_i(t)$. A window $t_{window}$ is determined for collecting relevant textual data from the time series and the textual data is collected at step 110. The time window $t_{window}$ may be a time window immediately preceding the time step $a_i(t)$ at which the anomaly was detected. At step 120, the relevant language model is trained on the collected textual data. At step 130, a cross-entropy H according to the language model in use is collected for every textual item p in the time window $t_{window}$. At step 140, a set of the textual items is selected based on the cross entropy values H. The set can be a predetermined number of textual items, ranked according to their cross entropy values H such that those having highest cross-entropy are included in the set or the set can be all textual items whose cross entropy value is above a predetermined threshold value. At step 150, the set of textual items is returned for further evaluation as part of determining why the anomaly occurred at time step $a_i(t)$.

The language model is trained is text that occurred right before anomaly. The trained language model is then used to calculated the cross entropies of text that occurred during the anomaly. For example, suppose an anomaly is detected at 5 pm. The language model is trained on textual items from 3 pm until 4:59 pm, i.e., the time just before the anomaly occurred. All textual items that occurred at 5 pm are gathered and fed into the trained language model to determine the cross-entropies for each of those textual items that occurred at 5 pm. The textual items are ranked by their cross-entropy values for evaluation of the cause of the anomaly.

The present framework may be performed by a computer system or processor capable of executing program code to perform the steps described herein. For example, system may be a computing system that includes a processing system, storage system, software, communication interface and a user interface. The processing system loads and executes software from the storage system. When executed by the computing system, software module directs the processing system to operate as described in herein in further detail, including execution of the cross-entropy ranking system described herein.

The processing system can comprise a microprocessor and other circuitry that retrieves and executes software from storage system. Processing system can be implemented within a single processing device but can also be distributed across multiple processing devices or sub-systems that cooperate in existing program instructions. Examples of processing system include general purpose central processing units, applications specific processors, and logic devices, as well as any other type of processing device, combinations of processing devices, or variations thereof.

The storage system can comprise any storage media readable by processing system, and capable of storing software. The storage system can include volatile and non-volatile, removable and non-removable media implemented in any method or technology for storage of information, such as computer readable instructions, data structures, program modules, or other data. Storage system can be implemented as a single storage device but may also be implemented across multiple storage devices or sub-systems. Storage system can further include additional elements, such a controller capable, of communicating with the processing system.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propagated signal.

User interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface.

Examples of how this framework can be implemented into a system to obtain the most likely textual items that triggered an anomaly are provided below.

EXAMPLE 1

Suppose we have conversational data between users and an airlines Intelligent Virtual Assistant (IVA). We analyze a time series that counts the number of times the "Mileage Plan" intent was hit every hour. Using the anomaly detection method provided by Netflix, SURUS, we find one anomaly on July 22nd, 11:00 P.M. Using a window of 24 hours, we collect all conversations that contain at least 1 user turn that hit the "Mileage Plan" intent from July 21st, 11:00 P.M to July 22nd, 10:00 P.M. We train a SLM on this data. The SLM takes as input a bigram and outputs the probability of the bigram's occurrence. We then collect all conversations from July 22nd, 10:00 P.M to 11:00 P.M. For every such conversation, we determine how "surprising" it is relative to the trained SLM using cross-entropy. We then rank these conversations by their cross-entropies and discover that the top 10 conversations all contain phrases such as "cannot log in" or "is your site down?", suggesting that something may have happened on the mileage plan website, making it difficult for users to log into their accounts.

EXAMPLE 2

Suppose we have a beer reviews website where users can submit short, textual reviews of beer as well as provide a rating out of 5 stars. We analyze two time series: (1) a count of the number of reviews per month for the beer "Pink Elephants on Parade" and (2) the average monthly rating for "Pink Elephants on Parade". Using a multi-step forecasting RNN which can deal with multivariate time series, we determine there is an anomaly on November. There is a spike in the number of reviews, and the average monthly rating has plummeted. We train a SLM on "Pink Elephants on Parade" reviews from August, September, and October. We rank "Pink Elephants on Parade" reviews from November using the trained SLM and cross-entropy and discover that the reviews with the highest cross-entropy all complain about the beer's metallic taste because, in November, "Pink Elephants on Parade" was packaged differently (in metal cans instead of glass bottles).

EXAMPLE 3

Suppose we work for a professional athlete as his PR consultants. To aid in our task, we analyze the average daily sentiment of people who reply to the athlete's tweets. In November, the average sentiment plummets and our chosen time series anomaly detection method warns there is an anomaly that month. We train a SLM on the tweet replies for the month of September and rank November's tweet replies using this trained SLM and cross-entropy. We discover that the tweet replies with the highest cross-entropy discuss domestic abuse. This is because a video was released to the media of the athlete in November kicking a woman.

Throughout this application, various publications may have been referenced. The disclosures of these publications in their entireties are hereby incorporated by reference into this application in order to more fully describe the state of the art to which this invention pertains, including [Danescu-Niculescu-Mizil et al., 2013] Danescu-Niculescu-Mizil, C., West, R., Jurafsky, D., Leskovec, J., and Potts, C. (2013). No country for old members: User lifecycle and linguistic change in online communities. In *Proceedings of the 22nd international conference on World Wide Web*, pages 307-318. ACM.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A method that includes one or more processing devices performing operations comprising:
    detecting an anomaly in a time series that is used to track metrices in textual data;
    identifying a time step $a_i(t)$ associated with the detected anomaly;
    collecting relevant textual data from a time window $t_{window}$ associated with the detected anomaly;
    training a language model on the relevant textual data;
    for every textual item at time step $a_i(t)$, calculating a cross-entropy value according to the language model; and
    generating a set of textual items having a cross-entropy value greater that a predetermined value.

2. The method of claim 1, wherein the time window $t_{window}$ is just before time step $a_i(t)$.

3. The method of claim 1, wherein the set of textual items is produced in rank order from greatest cross-entropy value to least cross-entropy value.

4. The method of claim 1, wherein the set of textual items contains a predetermined number of textual items having the greatest cross-entropy values.

5. The method of claim 1, wherein the cross-entropy value is indicative of how surprising a textual item is as compared with an immediate previous linguistic state according to the language model.

6. The method of claim 1, wherein the language model is snapshot language model.

7. The method of claim 1, further comprising identifying at least one of the textual items as most likely triggering the anomaly in the time series.

8. The method of claim 1, wherein a time window $t_{window}$ is a fixed time window.

9. The method of claim 1, wherein the cross-entropy is calculated according to:

$$H(p, SLM) = -\frac{1}{N}\sum_j \log(P_{SLM}(p_j))$$

where SLM is the language model,
$p_j$=n-grams making up p
N=number of n-grams
$P_{SLM}(p_j)$=probability of n-gram $p_j$ under the language model.

10. A system comprising:
    a processing device; and
    a memory device in which instructions executable by the processing device are stored for causing the system to:
    detect an anomaly in a time series that is used to track metrices in textual data;
    identify a time step $a_i(t)$ associated with the detected anomaly;
    collect relevant textual data from a time window $t_{window}$ associated with the detected anomaly;
    train a language model on the relevant textual data;
    for every textual item at time step $a_i(t)$, calculate a cross-entropy value according to the language model; and
    generate a set of textual items having a cross-entropy value greater that a predetermined value.

11. The system of claim 10, wherein the time window $t_{window}$ is just before time step $a_i(t)$.

12. The system of claim 10, wherein the set of textual items is produced in rank order from greatest cross-entropy value to least cross-entropy value.

13. The system of claim 10, wherein the set of textual items contains a predetermined number of textual items having the greatest cross-entropy values.

14. The system of claim 10, wherein the cross-entropy value is indicative of how surprising a textual item is as compared with an immediate previous linguistic state according to the language model.

15. The system of claim 10, wherein the language model is snapshot language model.

16. The system of claim 10, further comprising the memory device storing instructions executable by the processing device for causing the processor to identify at least one of the textual items as most likely triggering the anomaly in the time series.

17. The system of claim 10, wherein a time window $t_{window}$ is a fixed time window.

18. The system of claim 10, wherein the cross-entropy is calculated according to:

$$H(p, SLM) = -\frac{1}{N}\sum_j \log(P_{SLM}(p_j))$$

where SLM is the language model,
where $p_j$=n-grams making up p
N=number of n-grams
$P_{SLM}(p_j)$=probability of n-gram $p_j$ under the language model SLM.

19. A non-transitory computer-readable storage medium having program code that when executed by a processor causes a computing device to:
    detect an anomaly in a time series that is used to track metrices in textual data;
    identify a time step $a_i(t)$ associated with the detected anomaly;
    colletct relevant textual data from a time window $t_{window}$ associated with the detected anomaly;
    train a language model on the relevant textual data;
    for every textual item at time step $a_i(t)$, calculating calculate a cross-entropy value according to the language model; and
    generate a set of textual items having a cross-entropy value greater that a predetermined value.

20. The non-transitory computer-readable storage medium of claim 19, wherein the time window $t_{window}$ is just before time step $a_i(t)$.

21. The non-transitory computer-readable storage medium of claim 19, wherein the set of textual items is produced in rank order from greatest cross-entropy value to least cross-entropy value.

22. The non-transitory computer-readable storage medium of claim 19, wherein the set of textual items contains a predetermined number of textual items having the greatest cross-entropy values.

23. The non-transitory computer-readable storage medium of claim 19, wherein the cross-entropy value is indicative of how surprising a textual item is as compared with an immediate previous linguistic state according to the language model.

24. The non-transitory computer-readable storage medium of claim 19, wherein the language model is snapshot language model.

25. The non-transitory computer-readable storage medium of claim 19, wherein the program code when executed by the processor causes the computing device to identify at least one of the textual items as most likely triggering the anomaly in the time series.

26. The non-transitory computer-readable storage medium of claim 19, wherein a time window $t_{window}$ is a fixed time window.

27. The non-transitory computer-readable storage medium of claim 19, wherein the cross-entropy is calculated according to:

$$H(p, SLM) = -\frac{1}{N}\sum_j \log(P_{SLM}(p_j))$$

where SLM is the language model,
where $p_j$=n-grams making up p
N=number of n-grams
$P_{SLM}(p_j)$=probability of n-gram $p_j$ under the language model SLM.

* * * * *